United States Patent [19]

Gelman

[11] Patent Number: 4,813,325
[45] Date of Patent: Mar. 21, 1989

[54] CIRCULAR SAW BLADE

[75] Inventor: Mark Gelman, Columbia, S.C.

[73] Assignee: Textron Inc., Providence, R.I.

[21] Appl. No.: 55,718

[22] Filed: May 28, 1987

[51] Int. Cl.<sup>4</sup> ............................................. B27B 33/08
[52] U.S. Cl. ........................................ 83/844; 56/295
[58] Field of Search ............... 83/835, 836, 837, 838, 83/839, 840, 841, 842, 844, 852, 855, 848, 849, 834, 833; 56/295

[56] References Cited

U.S. PATENT DOCUMENTS

| 869,574 | 10/1907 | Hather | 83/838 |
| 3,425,467 | 2/1969 | Willis | 83/839 |
| 4,348,927 | 9/1982 | Olmr | 83/834 |

FOREIGN PATENT DOCUMENTS

| 240352 | 10/1986 | Fed. Rep. of Germany. | |
| 1037773 | 9/1953 | France | 83/841 |
| 1194641 | 5/1959 | France. | |

Primary Examiner—Frank T. Yost
Assistant Examiner—Scott A. Smith
Attorney, Agent, or Firm—Webb, Burden, Ziesenheim & Webb

[57] ABSTRACT

A rotary saw blade having a substantially circular disc with opposed parallel faces and a centrally located opening through the disc to receive a drive member to rotate the disc. The outer edge of the disc has a plurality of equally spaced depth gauge protuberances located around its periphery and a pair of spaced holes extend through the disc adjacent to the outer edge at each protuberance. A saw tooth is attached to the disc on one face at alternate pairs of holes and a saw tooth is attached to the disc on the opposite face at the remaining pairs of holes. Each saw tooth has a cutting edge and a depth gauge and the depth gauge on each saw tooth has a shape and a size which are complementary with a depth gauge protuberance on the outer edge of the disc, and a face of the depth gauge on each saw tooth is in contact with a face of a protuberance on the outer edge of the disc. Each saw tooth is attached to the disc by rivets.

8 Claims, 2 Drawing Sheets

CIRCULAR SAW BLADE

BACKGROUND OF THE INVENTION

1. Field of the Invention

The invention relates generally to a circular saw blade and more particularly to a circular saw blade utilizing conventional use links normally used on the chain of a chain saw attached to a generally circular disc for use in brush cutting. Each cutter link is attached to the circular disc by a rivet which may have an enlarged center portion located within the disc.

In clearing land of brush and small trees, lightweight machines are used which are carried by the workmen and include a small gasoline driven engine which rotates a drive shaft having a cutting blade attached thereto. These machines are used in areas which are remote from service facilities, and hence it is important that the equipment be simple, efficient and easy to repair on site. The blades which are currently utilized generally have teeth formed integrally with the disc, and if a blade is to bbe sharpened, the whole blade must be removed and a new blade inserted on the drive shaft so that the removed blade can be taken to a service facility for sharpening. Such requires a substantialy inventory of blades at the job site and requires the transportion of blades to and from the service facility which is expensive and time consuming. Additionally, it is important that the blade design minimize the kick reaction which occurs when the blade contacts an object.

2. Description of the Prior Art

U.S. Pat. No. 4,627,322 discloses a circular saw blade assembly having a central portion formed from two discs which define a chain track around the circumference thereof and a regular chain saw chain is located in the track. In the aforementioned patent, the cutting links and depth gauges are all a part of a continuous chain fitted into the slot, and hence if the chain breaks at any point, the circular saw blade assembly is rendered inoperable. Additionally, the cutting chain has a tendency to slip in the track during cutting which decreases the cutting efficiency of the blade.

U.S. Pat. Nos. 2,958,348; 3,425,467 and 4,563,929 and Swedish Pat. No. 80,528 disclose rotary cutting blades, but none of these patents disclose depth gauges formed directly on the periphery of the disc portion of the blade, and for this reason the blades disclosed in these patents have a greater tendency to the kick reaction than the blade disclosed herein.

None of the known prior art discloses a circular saw blade assembly wherein standard chain cutter links are attached to a cylindrical disc which has depth gauge portions formed directly thereon to reinforce the depth gauge on the standard saw chain cutter link and to reduce the kick reaction while increasing productivity.

SUMMARY OF THE PRESENT INVENTION

The invention is directed to a saw blade which utilizes a substantially cylindrical disc having raised portions or protuberances spaced around its periphery corresponding to the spacing of the depth gauges of the saw teeth which are cutter links normally utilized on a regular saw chain. The saw teeth or cutter links are attached around the periphery of the disc in combination with either a plain elongated tie strap or an elongated tie strap which includes a depth gauge portion. Each tie strap is located on the face of the disc opposite the face upon which the corresponding cutter link is mounted. The first arrangement described above is termed a dual raker blade, and the second arrangement is termed a triple raker blade.

In both arrangements, the cutter links and tie straps are attached to the disc by means of two parallel rivets which extend through holes in the disc and through correspondingly spaced holes in the base of each cutter link and in each tie strap either with or without a depth gauge portion. The rivets may have an enlarged center portion for contact with the periphery of a hole through the periphery of the disc.

The rivets are peened over the hold the cutter links and tie straps onto the disc, and therefore a cutter link may be easily removed and replaced in the field with normal tools within a relatively short period of time as distinguished from taking a blade to a repair facility. Refurbishing the saw blade in the field with factory sharpened cutter links contributes greatly to the efficiency of the user and decreases the cost of transporting the blade to a repair facility and maintaining an inventory of blades in the field.

By utilizing removable cutter links on a disc-shaped base for brush cutting, blades may be readily sharpened or replaced with new cutter links in the field by the machine operator. Also, the depth gauges on the cutter links and the depth gauge protuberances on the disc act as a solid unit which prevent breaking due to contact between the cutting edges of the cutter links and objects such as rocks which will damage the cutting edges. The design of the disc with depth gauge protuberances provides firm resistance to the blade binding in a cut which substantially reduces the kick reaction of the blade and consequently provides for enhanced control by the operator. The circular saw blade of the invention is of relatively low cost as it utilizes cutter links and tie straps which are standard for chain saw chains and need not be specially made for inclusion in the circular saw blade.

BRIEF DESCRIPTION OF THE DRAWINGS

In the following description of the preferred embodiments of the invention, like reference numerals refer to like parts throughout.

DESCRIPTION OF THE PREFERRED EMBODIMENTS

Figure 1:
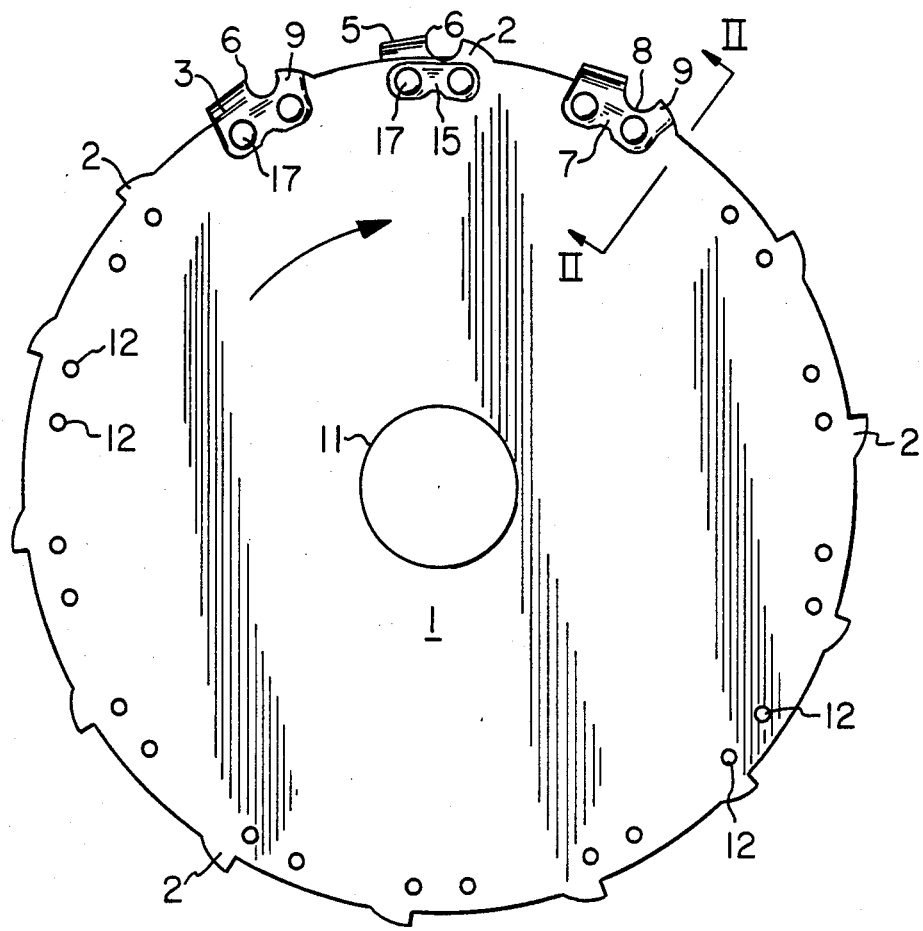
FIG. 1 is a plan view of a circular saw blade having alternate cutter links and tie straps connected around the periphery of the disc by rivets.

The rotary saw blade shown in FIG. 1 of the drawings is a dual raker blade as it has only two depth gauges in connection with each cutter link or saw tooth. The blade consists of a centerl disc portion 1 formed at its periphery with a plurality of substantially equally spaced depth gauge protuberances 2 which are complementary with the depth gauges of the cutter links 3. Thus, each cutter link or saw tooth 3 has a top plate 5 with a leading cutting edge 6, a base portion 7, a gullet 8 and a depth gauge 9. The base portion of each cutter link is formed with a pair of spaced holes (not shown).

As will be seen in FIG. 1 of the drawings, the center portion of the disc 1 has a central hole 11 formed therein to accommodate a drive shaft for rotating the blade and a plurality of spaced pairs of holes 12 around its peripheral portion adjacent to the outer edge and in relationship to the depth gauge protuberances 2 on disc 1 for proper alignment with the depth gauge on each cutter link. Each tie strap 15 has a pair of spaced holes which correspond with the spacing of the holes in the cutter links and each pair of holes 12 in the disc. The rivets 17 have their ends peened over to hold the cutter links and tie straps tightly against the opposed faces of the disc 1. As will also be seen in FIG. 1 of the drawings, alternate cutting links are on opposite faces of the disc, i.e., right hand cutter links are on one side of the disc and left hand cutter links on the opposite side of the disc.

Figure 2:
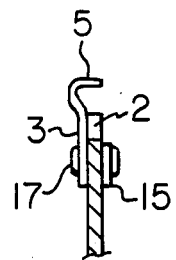
FIG. 2 is a section on line II—II of FIG. 1.

As shown in FIG. 2 of the drawings, the depth gauge 9 formed on the cutter link 3 has the same shape and height as the depth gauge protuberance 2 formed on the periphery of disc 1 so that, in effect, a double depth gauge is provided giving added strength to the depth gauge and protection of the cutting edge 6 is increased.

Figure 3:
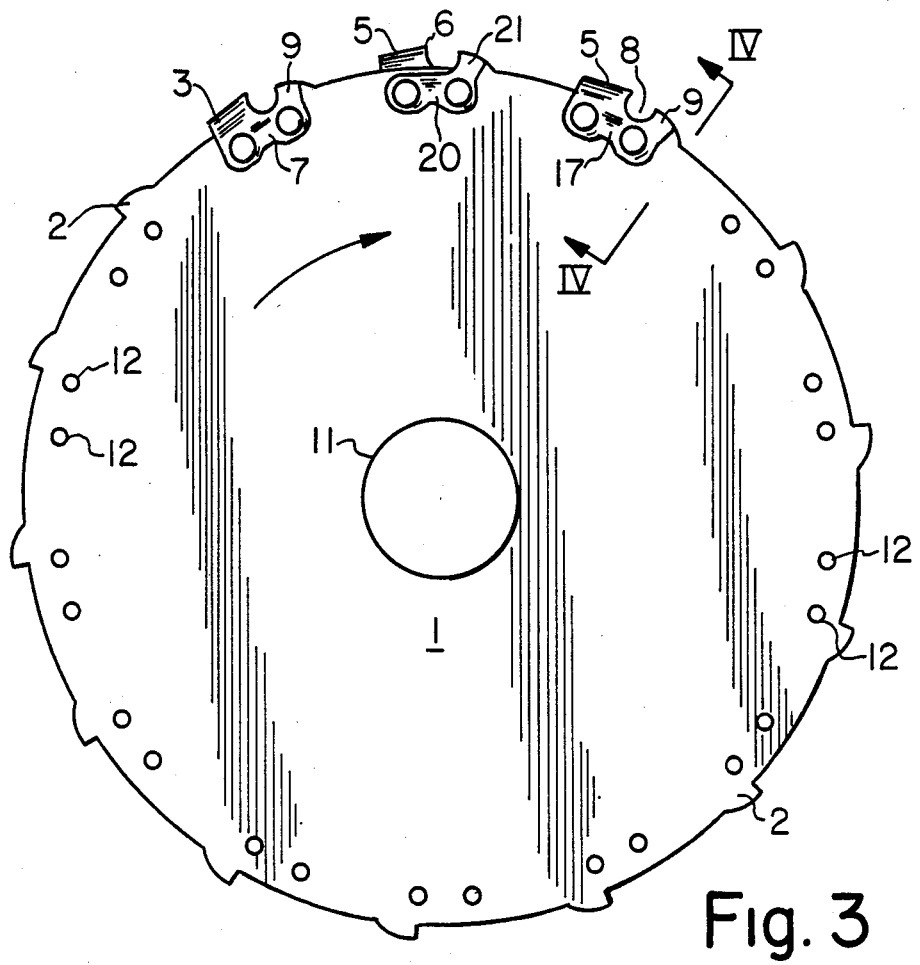
FIG. 3 is a plan view of a circular cutting blade similar to that shown in FIG. 1 except that the blade of FIG. 3 has a depth gauge on each tie strap.
Figure 4:
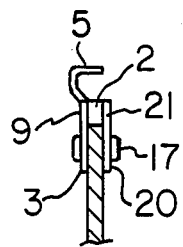
FIG. 4 is a section on line IV—IV of FIG. 3.

The embodiment shown in FIGS. 3 and 4 of the drawings is the same as that shown in FIGS. 1 and 2 except that the tie strap 20 is formed with a depth gauge 21 which is complementary in shape and height to the depth gauge 9 on the cutter link in the depth gauge protuberance 2 on the periphery of the disc 1. It is for this reason that the blade shown in FIGS. 3 and 4 of the drawings is termed a triple raker blade. The triple raker blade provides additional strength and additional protection for the cutting edge, and therefore the blade may be utilized to cut heavier brush when the terrain is more rocky than normal. Additionally, the triple raker blade has a greater positive effect on the reduction of kick reaction during cutting and, therefore, provides enhanced control and greater productivity. The reduction in kickback is achieved as a result of the increased facial area of the three depth gauges.

Figure 5:
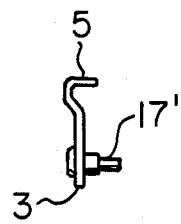
FIG. 5 is an end view of a cutter link having a preset rivet having an enlarged center portion for attaching the cutter link to the disc.
Figure 6:
FIG. 6 is an end view of a tie strap with a preset rivet having an enlarged center portion.
Figure 7:
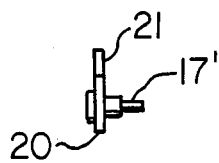
FIG. 7 is an end view of a tie strap having a depth gauge portion with a preset rivet having an enlarged center portion.

FIG. 5 of the drawings shows a cutter link which is the same as the cutter link described heretofore except that it is provided with a preset rivet 17' which is installed at the factory. The cutter link with a preset rivet may be installed more easily than a cutter link which merely has rivet receiving holes. The tie straps of both the dual raker designa and the triple raker design are shown, respectively, with a preset rivet 17' in FIGS. 6 and 7 of the drawings. Each of the preset rivets 17' has an enlarged diameter center portion which is substantially the same length as the width of said disc and fits within a hole 12 in disc 1 and contacts the periphery of the hole. In this arrangement, the holes 12 in the disc have a larger diameter than the holes in the cutter links and the tie straps. The utilization of rivets with an enlarged center portion provides greater rigidity to the connection between the cutter links and the disc, and a stronger rotary blade saw results. The regular rivets 17 may also be provided with an enlarged diameter center portion to increase the rigidity of the connection between the cutter links and the disc.

Although a central hole 11 is shown and described herein for receiving a drive means to rotate the saw blade, it will be understood by those skilled in the art that other arrangements may be utilized to rotate the saw blade.

While preferred embodiments of the invention have been described herein, it is to be understood that the invention may be embodied within the scope of the appended claims.

I claim:

1. A rotary saw blade for use with a brush cutting machine, and blade comprising a substantially circular disc having opposed substantially parallel faces, said disc having means for receiving a drive means to rotate said disc, said disc having an outer edge and a plurality of substantially equally spaced depth gauge protuberances located around said outer edge, a pair of spaced holes extending through said disc located adjacent to said outer edge and adjacent to each of said protuberances, a saw tooth attached to said disc on one face of said disc at alternate pairs of holes and an alternate saw tooth attached to said disc on the opposite face of said disc at the remaining pairs of holes, each saw tooth having a cutting edge and a depth gauge and said depth gauge on each saw tooth having a shape and size substantially complementary with a depth gauge protuberance on the outer edge of said disc and having a face in substantial contact with a face of a protuberance and means for attaching each saw tooth to said disc, whereby said depth gauge protuberances on said outer edge of said disc reduce the kick reaction of said saw blade.

2. A rotary saw blade as set forth in claim 1 wherein said attaching means are rivets having an enlarged diameter center portion, and said spaced holes in said disc are enlarged to receive said enlarged diameter center portion of said rivets.

3. A rotary saw blade as set forth in claim 1 wherein each of said alternate saw teeth located on opposite sides of said disc around the periphery of said disc are left-handed and right-handed teeth.

4. A rotary saw blade as set forth in claim 1 wherein each saw tooth has a gullet between said cutting edge and said depth gauge, and the base of said gullet is located cclose to the outer edge of said disc when said saw tooth is attached to said disc.

5. A rotary saw blade as set forth in claim 1 wherein said means for attaching a drive means to said disc is a substantially centrally located opening in said disc adapted to receive said drive means.

6. A rotary saw blade as set forth in claim 1 wherein a tie strap is positioned opposite each saw tooth on the opposite face of said disc from the saw tooth, each saw tooth each tie strap having a pair of holes complementary with the pairs of holes of said disc and said attaching means are rivets which extend through said holes in said saw tooth and said tie strap and said holes in said disc to fix each saw tooth and each tie strap to opposite faces of said disc.

7. A rotary saw blade as set forth in claim 6 wherein one of said saw tooth or said tie strap has a preset rivet in each hole of said pair of holes and said preset rivets extend through said holes in said disc and through said holes in the other of said cutter link or said tie strap to hold each cutter link and each tie strap in contact with opposite faces of said disc.

8. A rotary saw blade as set forth in claim 6 wherein each tie strap has a depth gauge formed thereon having a shape and size substantially complementary with a depth gauge protuberance on the outer edge of said disc and having a face in substantialy contact with a face of a protuberance.

* * * * *

UNITED STATES PATENT AND TRADEMARK OFFICE
CERTIFICATE OF CORRECTION

PATENT NO. : 4,813,325

DATED : March 21, 1989

INVENTOR(S) : Mark Gelman

It is certified that error appears in the above-identified patent and that said Letters Patent is hereby corrected as shown below:

Column 1 Line 8 "use" should read --cutter--.

Column 1 Line 22 "bbe" should read --be--.

Column 1 Line 25 "substantialy" should read --substantial--.

Column 1 Line 26 "transportion" should read --transportation--.

Column 2 Line 12 "the" (first occurrence) should read --to--.

Column 2 Line 27 "prevent" should read --prevents--.

Column 2 Line 66 "centerl" should read --central--.

Column 3 Line 51 "designa" should read --design--.

UNITED STATES PATENT AND TRADEMARK OFFICE
CERTIFICATE OF CORRECTION

PATENT NO. : 4,813,325

DATED : March 21, 1989

INVENTOR(S) : Mark Gelman

It is certified that error appears in the above-identified patent and that said Letters Patent is hereby corrected as shown below:

Column 3 Line 61 "connection" should read --connections--.

Claim 4 Column 4 Line 42 "cclose" should read --close--.

Claim 6 Column 4 Line 49 after "tooth" insert --and--.

Claim 6 Column 4 Line 50 "of" (second occurrence) should read --in--.

Claim 8 Column 4 Line 66 "substantialy" should read --substantial--.

Signed and Sealed this

Seventeenth Day of October, 1989

Attest:

DONALD J. QUIGG

Attesting Officer

Commissioner of Patents and Trademarks